April 12, 1949.　　A. F. ECKEL　　2,466,983
SLIDE RULE
Filed Oct. 24, 1947　　2 Sheets-Sheet 1
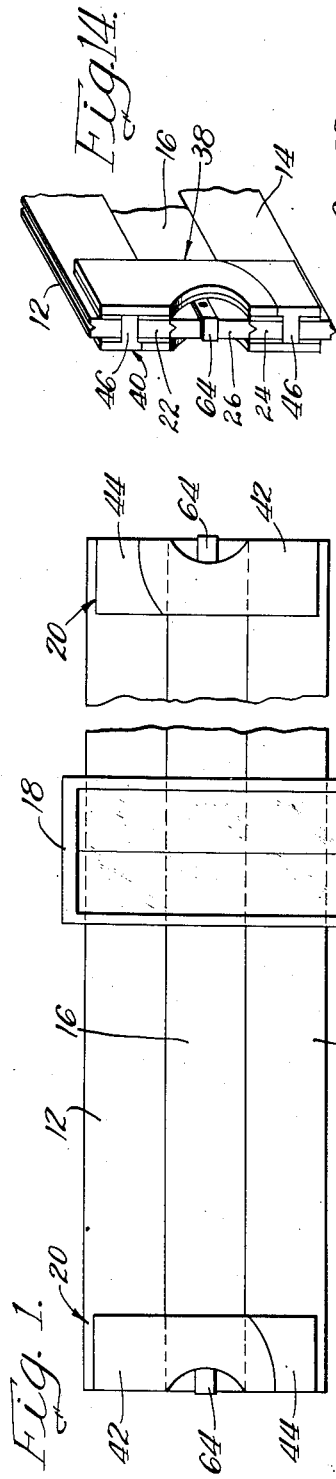
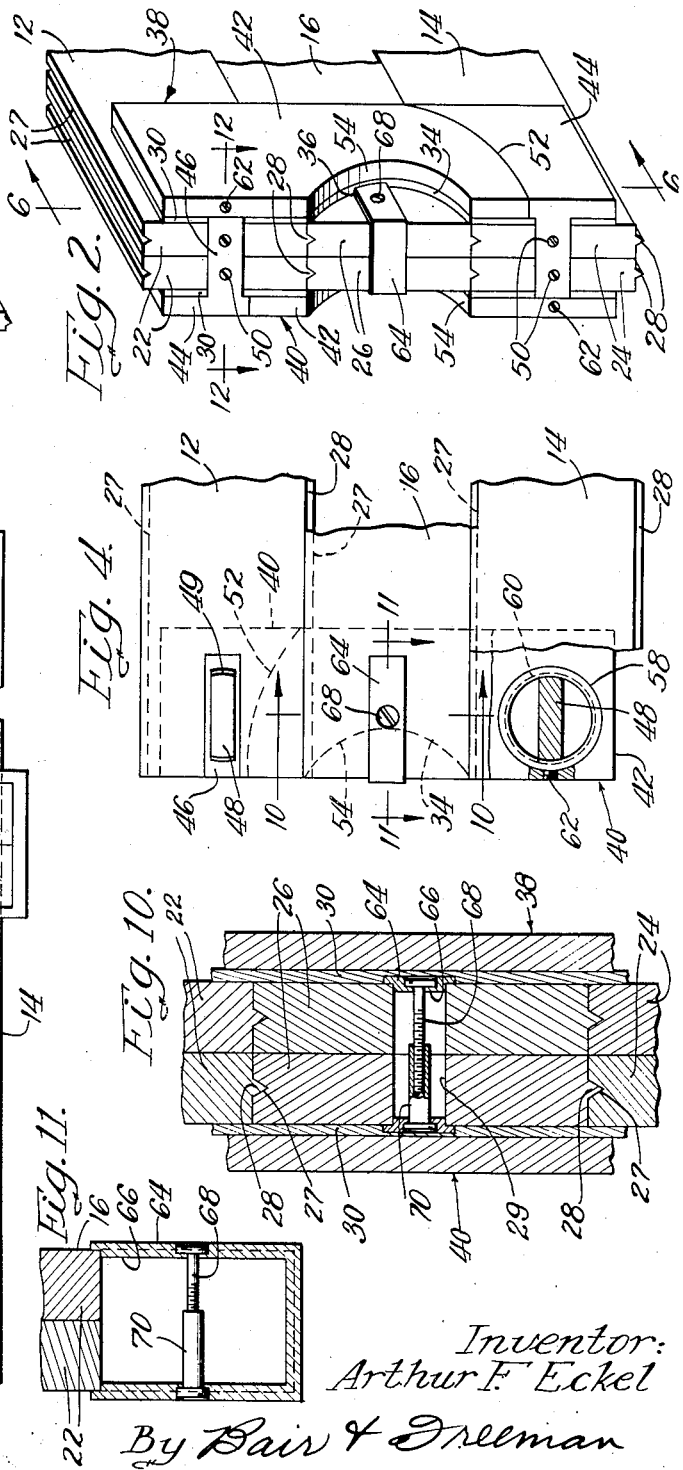
Inventor:
Arthur F. Eckel
By Bair & Freeman
Attys April 12, 1949.　　A. F. ECKEL　　2,466,983
SLIDE RULE
Filed Oct. 24, 1947　　2 Sheets-Sheet 2
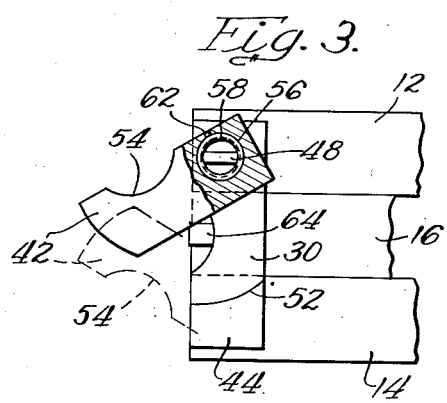
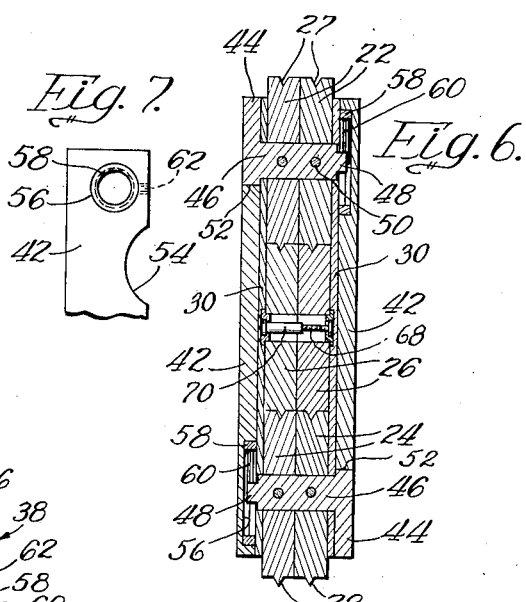
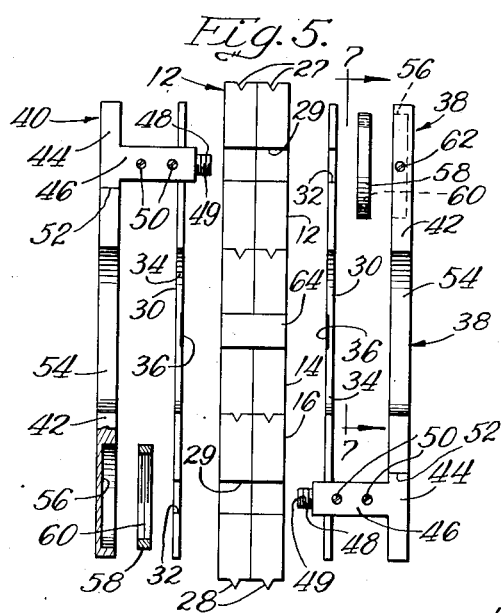
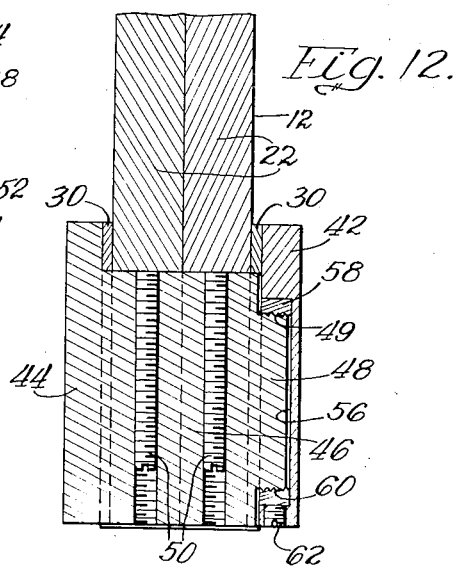
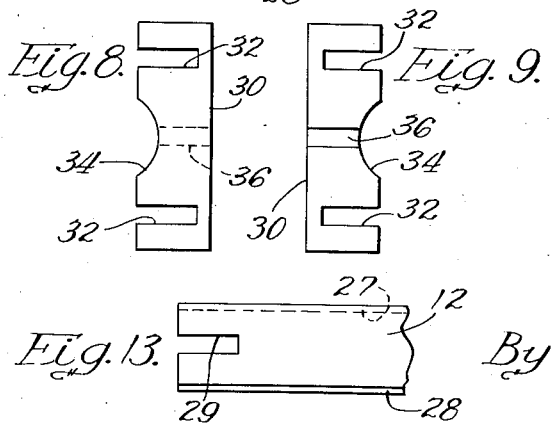
Inventor:
Arthur F. Eckel
By Bair & Freeman
Att'ys.

Patented Apr. 12, 1949

2,466,983

UNITED STATES PATENT OFFICE 2,466,983

SLIDE RULE

Arthur F. Eckel, Evanston, Ill., assignor to Louise Pickett, La Grange, Ill., and Myrtle Eckel, Evanston, Ill.

Application October 24, 1947, Serial No. 781,855

22 Claims. (Cl. 235—70)

This invention relates to slide rules.

An object of the invention is the provision of a slide rule which can be completely disassembled and the parts thereof replaced with other parts, and re-assembled.

Another object is the provision of a slide rule which can be disassembled and reassembled by the use of quick detachable clamping means.

Another object of the invention is the provision of a slide rule in which the stator elements and the slider are each made up of component parts, each of which is provided with scales on both sides; each component part can then be reversed for presenting either scale in position for use.

Still another object is the provision of a slide rule in which the stator elements and the slider are each made up of component parts and any of the component parts can be utilized in either the stator or the slider.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 illustrates a complete slide rule made according to the present invention;

Figure 2 is an isometric view of one end of the slide rule;

Figure 3 is a side view of a portion of the slide rule showing the position of the locking means when unlocked, a portion of the latter being broken away;

Figure 4 is a view of one end of the slide rule with the plates forming the locking means removed from the side of the observer, and a portion of the device being broken away;

Figure 5 illustrates one end of the slide rule, showing the locking means in exploded position;

Figure 6 is a vertical, sectional view taken on line 6—6 of Figure 2;

Figure 7 is a view of the inside surface of a portion of one of the locking levers, as view on line 7—7 of Figure 5;

Figure 8 is a plan view of the outside surface of one of the retaining plates;

Figure 9 is a view of the inside surface of the retaining plate shown in Figure 8;

Figure 10 is an enlarged sectional view taken on line 10—10 of Figure 4;

Figure 11 is an enlarged view taken on line 11—11 of Figure 4;

Figure 12 is an enlarged sectional view taken on line 12—12 of Figure 2;

Figure 13 is a view of one end of one of the component parts making up the stator elements and slider; and Figure 14 is an isometric view of one end of a modified form of slide rule, illustrating elements thereof, each being made up of a single component.

Referring now in detail to the drawings, the slide rule made according to my invention is illustrated as a whole in Figure 1, wherein 12 and 14 designate stator elements which together make up the stator of the rule. A slider 16 slides between the stator elements 12 and 14. For convenience herein, the slider 16 and the stator elements 12 and 14 will all be referred to as elements. The customary cursor 20 slides over the whole rule. The numeral 20 designates combination end pieces and locking means forming a novel feature of the present invention. The end pieces 20 secure the stator elements 12 and 14 together in spaced relation for reception of the slider 16. The end pieces 20, which also include the novel locking means are provided at both ends of the rule and are either identical or symmetrical; therefore a complete description of one will suffice for both.

The stator elements 12 and 14 and the slider 16, in one embodiment of the invention, are each made up of a plurality of components, which in each case, together form the respective elements of the rule. These components, for convenience, will be given separate numerals, the stator element 12 being made up of components 22, the stator element 14 being made up of components 24, and the slider 16 being made up of components 26. The components just referred to, as observed particularly in Figures 2 and 5, are congruent in length and breadth, and of a thickness such that when two are placed together the thickness of the completed element is that desired for the slide rule. Each component has scale faces on opposite sides, which are provided with scale markings. In the present instance, two such components make up each element, but that number may be varied as desired to meet different requirements; for example, three or more components may be employed, or only one component, as referred to in detail later herein. Each component is provided with a groove element 27 in one edge surface, and a tongue element 28 in the other edge surface, both running longitudinally of the component. Each of the components is provided with an elongated rectangular-shaped notch 29, as illustrated in Figure 13, in each end thereof and opening out of the respective end, for purposes of locking them in place by the end pieces and locking means 20.

Each end piece 20, which comprises the novel locking means, includes a pair of retaining plates 30, (Figures 5, 8 and 9) one to be placed on either side of the rule. Each of the plates 30 is provided with a rectangularly-shaped notch 32 in each end thereof and opening out thereof from one side. These notches 32 are the same in size and shape as the notches 29 in the components making up the slide rule. An arcuate portion 34 is cut out of the same side of the plate 30, centrally thereof and between the notches 32. A transverse groove 36 parallel with the notches 32 is formed in the inner surface of each retaining plate in register with the arcuate portion 34, as illustrated in Figures 8 and 9. The two retaining plates 30 in most instances can be identical, although reversed with respect to each other when assembled in the locking device. Figure 8 shows the outer surface of one of the retaining plates and Figure 9, the inner surface thereof.

A pair of locking plates are also employed in the locking means, these plates being indicated at 38 and 40, one being disposed on either side of the rule and outwardly of the respective retaining plate 30. Each of the locking plates 38 and 40 includes a locking lever 42 and a cooperating stationary element 44. The locking plates 38 and 40 are of the same outline shape as the retaining plates 30, that is, rectangular in outline. Each stationary element 44 is provided with a transverse rectangularly shaped extension 46 having a reduced terminal 48. The terminal 48 is provided with threads 49 on its lateral edge surfaces as illustrated in Figures 4 and 5. The extensions 46 are congruent in cross section with the shape of the notches 29 in the components of the rule, and with the notches 32 in the retaining plates 30. The extension 46 is provided with set screws 50 threaded in openings therethrough parallel with the stationary plate 44 and extending through the long cross sectional dimension of the extension (Figure 12).

The stationary element 44 and corresponding locking lever 42 lie in a common plane and are provided with cooperating and registering curved surfaces indicated by the line 52. Each locking lever 42 is provided with an arcuate cut-out portion 54 in one of the side edges, adapted to register with the arcuate portion 34 of the corresponding retaining plate 30.

Above the arcuate portion 54 and adjacent the top of the lever 42, (as the locking plate 38 at the right of Figure 5 is oriented) is provided a circular cavity 56 formed in the inner side surface of the locking lever. A locking ring 58 having interior threads 60 is inserted in the circular cavity 56 and secured therein by a set screw 62 threaded through one wall surrounding the ring (Figure 7). The cavity 56 and locking ring 58 in the locking plate 40 on the opposite side of the rule are disposed at the bottom. The locking plates 38 and 40 are identical in construction, as are retaining plates 30, although oppositely and symmetrically disposed, for interlocking in the assembly of the rule.

In assembling the rule, the components 22 are fitted together to form the stator element 12 and similarly the components 24 are fitted together to form the stator element 14, with the groove elements 27 and tongue elements 28 all oriented in the same direction. Next, the retaining plates 30 are placed over the ends of the stator elements so that the notches 32 in the retaining plates are in register with the notches 29 in the components of the stator elements. The arcuate cut-out portions 34 of the retaining plates 30 are therefore directed outwardly from the end of the rule and the grooves 36 are disposed inwardly toward each other. The extension 46 on the stationary element of the locking plate 40 is inserted into the notches which are then in register in the stator element 12. Then the locking lever 42 of the locking plate 38 in which the locking ring 58 has already been inserted is placed on the opposite side of the rule with the locking ring 58 threaded over the threads 49 on the extension 48. If desired, the locking ring 58 may be threaded on the threads 49 and thereafter the locking plate 42 put in place with the cavity 56 therein fitting over the locking ring 58 after which the set screw 62 is tightened.

The next step is to place the stationary element 44 of the locking plate 38 in place. The extension 46 on this stationary element is inserted through the notches 32 and 29 which are in register in the lower stator element 14, and the locking lever of the locking plate 40 put in place similarly as described in connection with the locking plate 38.

With the above steps completed, the extensions 46 on the locking plates 38 and 40 extend through the respective stator elements, and the retaining plates 30 act through the extensions 46 for retaining the stator elements in position. In Figure 4 the locking plate 38 and the retaining plate 30 are removed from the side of the rule nearest the observer, and the end of the stator element 14 is broken away to more clearly illustrate the relative positions and functions of the various elements. The threads 49 on the terminal portions 48 and the locking rings 58 in the present instance are left-handed threads so that when the locking levers 42 are rotated counterclockwise, the locking rings 58 are run down on the terminal portions 48 toward each other, bringing the retaining plates 30 into clamping engagement over the components making up the respective stator elements. The desired degree of clamping pressure may be obtained by rotatively adjusting the rings 58 in the cavities 56, and thereafter securing them in set position by the set screws 62; then when the locking levers 42 are positioned in register with the corresponding stationary elements 44, the desired clamping pressure is attained. The curved surfaces, as determined by the line 52 on the stationary members 44 and the locking levers 42 are preferably arranged so that the inner ends thereof are closer to the pivot points of the levers, to prevent the levers from being swung inwardly from the ends of the rule beyond the stationary plates 44. Suitable catch means may be provided, if desired, between the stationary plates 44 and the levers 42 to normally retain the levers in locking position.

To unlock the rule, the levers 42 are rotated counterclockwise, to the positions illustrated in Figure 3, whereby the locking rings 58 are run outwardly on the threads 49, releasing the pressure on the components of the stator elements. The locking plates 38 and 40, and the retaining plates 30 can then be slipped off the ends of the rule.

Figure 12 illustrates the purpose of the set screws 50. These set screws can be adjusted in the extension 46 and out of the inner edge thereof into engagement with the end surfaces of the components making up the stator elements. If it is desired to realign the scale markings of one stator element with respect to the other, the set screws 50 can be utilized for this purpose, that is, to adjust the components of the stator elements slightly longitudinally of the rule.

The components 26 making up the slider 16 are identical in construction with those making up the stator elements. These components are provided with rectangular slots 29 and are held together by U-shaped clamps 64, one on each end. The web portion of each clamp 64 is positioned across the open end of the slot, and the flange portions of the clamp extend longitudinally of the slider and fit over the sides of the slot. The inner surface of the clamp 64 is provided with an inwardly extending projection 66 which extends into the slot and retains the clamp against displacement while the lateral extensions of the clamp fit on the outer surfaces of the components. The means for clamping the clamp 64 in place comprises a screw 68 inserted from one of the flange portions and threaded into the interior of a sleeve 70, both the screw 68 and the sleeve 70 having heads with kerfs therein for tightening purposes. The screws 68 and the sleeves 70 bear on the side flanges of the clamp 64 and retain the clamp in position in the slots 29 of the components making up the slider. The grooves 36 in the retaining plates 30 accommodate the clamp 64 in the sliding movements of the slider.

The slots 29 in the slider and in the stator elements are all of the same size enabling the components making up the stator elements to be used in the slider, and vice versa.

Since all of the components 22, 24, and 26, making up the stator elements and the slider are arranged with the groove element 27 on the upper edge and the tongue element 28 on the lower edge, any component can be transposed to any other position of the rule.

It will be evident from the foregoing that the slide rule made according to the present invention can be quickly assembled and disassembled. Any of the components making up the stator elements or slider can be removed and replaced by other components or the components in the rule can be changed among themselves. As referred to above, each of the components is provided with scale markings on both of its faces, and any one of the components can be removed and turned end-for-end, presenting the opposite scale surface outwardly, and clamped in place.

Preferably, all of the respective elements making up the end pieces or locking mechanisms 20 are identical so that any of the elements thereof can be replaced by any of the other elements. For example, in Figure 1, the locking lever 42 at the left end of the rule is swung clockwise about a pivot point in the stator element 12, and the locking lever at the right end of the rule, while also swinging clockwise, pivots about a point in the bottom stator element 14. In this manner, the end pieces and locking mechanisms need not be ear marked for a particular position in the rule.

As viewed in Figure 12, the extension 46 terminates slightly inwardly of the outside surface of the retaining plate 30 on the opposite side of the rule, so that when the locking lever 42 is in locking position, all of the thrust thereof will be exerted against the components making up the respective stator element. Similarly, the terminal portion 48 terminates slightly short of the bottom surface of the cavity 56 for a like purpose.

Figure 14 illustrates a slide rule in which the stator elements 12 and 14 and the slider are each made up of a single component. In such a construction, any element may be readily replaced by any other element, and of course, any element may be reversed, end for end, to present either scale face thereof to either side of the rule. In this construction, the transverse extensions 46 are shorter than in the previous illustrations, to accommodate the lesser thickness of the elements of the rule. The clamp 64 is employed on the slider 16 in this construction to provide a finished appearance and to enable the user to grasp the slider more readily. In other respects the construction and use of the rule is the same as in the previous illustrations.

It is intended that the claims herein are not to be limited to any particular number of components making up the elements of the rule.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A slide rule comprising, in combination, a pair of stator elements and a slider, said stator elements having cut out portions formed in their ends, and end pieces adapted to cooperate with said cut out portions and be secured to said stator elements for securing said stator elements together in spaced relation, said slider having cut out portions in its ends, said slider being interchangeable with either of said stator elements and adapted for securement in said end pieces.

2. A slide rule comprising, in combination, a pair of stator elements, and a slider, said stator elements and slider being mutually interchangeable, and quick-detachable end pieces securing the stator elements together in spaced relation.

3. A slide rule comprising, in combination, a pair of stator elements and a slider, said stator elements having clamping surfaces formed in their ends, and end pieces adapted to cooperate with said clamping surfaces and be secured to said stator elements for securing said stator elements together in spaced relation, said slider having clamping surfaces in its ends, said slider being interchangeable with either of said stator elements and adapted for securement in said end pieces.

4. A slide rule comprising, in combination, a pair of stator elements and a slider, each of said stator elements being made up of a plurality of components, and means interconnecting said stator elements and securing them together in spaced relation, said means securing the components of each of said stator elements together.

5. A slide rule comprising, in combination, a pair of stator elements and a slider element, each of said elements being made up of a plurality of components, all of said components being mutually interchangeable, means detachably securing said stator elements together in spaced relation, said means securing together the components in the respective stator elements, and means detachably securing together the components in said slider.

6. A slide rule comprising, in combination, a pair of stator elements and a slider element, each of said elements being made up of a plurality of components, each of said components having scale faces on both sides thereof and being reversible for exposing either scale surface outwardly, all of said components being mutually interchangeable, means detachably securing said stator elements together in spaced relation, said means securing together the components in the respective stator elements, and means detachably securing together the components in said slider.

7. A slide rule comprising, in combination, a pair of stator elements and a slider, each of said stator elements being made up of a plurality of components, end pieces interconnecting said stator elements, and clamp means for securing together the components of each of said stator elements, said clamp means having a clamping position and being adjustable for varying the clamping pressure on said components when in clamping position.

8. A slide rule, comprising in combination, a pair of stator elements and a slider, each of said stator elements being made up of a plurality of components, each of said stator elements having a cut out portion formed in each end thereof and extending through its components, end plates on opposite sides of each end of the rule for securing the stator elements together in spaced relation, said end plates having projections extending through respective ones of said cut out portions, and lever means pivotally secured on the extended ends of said projections, said levers having means cooperating with respective projections operable on swinging said levers for clamping said components together.

9. A slide rule comprising, in combination, a pair of stator elements and a slider, each of said stator elements being made up of a plurality of components, each of said stator elements having a cut out portion formed in each end thereof and extending through its components, end plates on opposite sides of each end of the rule for securing the stator elements together in spaced relation, said end plates having projections extending through respective ones of said cut out portions, the terminal portions of said projections being threaded, and levers threaded on said threaded ends of said projections, said levers being operable on turning on said threaded portions for clamping said components together.

10. A slide rule comprising, in combination, a pair of stator elements and a slider, each of said stator elements being made up of a plurality of components, each of said stator elements having a cut out portion formed in each end thereof and extending through its components, end plates on opposite sides of each end of the rule for securing the stator elements together in spaced relation, said end plates having projections extending through respective ones of said cut out portions, the terminal portions of said projections being threaded, levers individual to said threaded portions, each lever having a threaded ferrule fixed therein, said ferrules being adapted to be threaded on respective threaded portions of said extensions, said levers being adapted on swinging on said threaded portions for clamping said components together, said ferrules being adjustable circumferentially for varying the pressure exerted by said levers on said components.

11. A slide rule comprising, in combination, a pair of stator elements and a slider, each of said stator elements being made up of a plurality of components, end plates on opposite sides of each end of the rule for securing said stator elements together in spaced relation, lateral projections on said plates, one of said projections being provided for each end of each stator element, said projections extending through the plates on the opposite side of the rule, and lever means cooperable with the extended ends of said projections for compressing said end plates into clamping engagement with the components of said stator elements.

12. A slide rule, comprising in combination, a pair of stator elements and a slider, each of said stator elements being made up of a plurality of components, each of said stator elements having a cut out portion formed in each end thereof and extending through its components, end plates on opposite sides of each end of the rule for securing the stator elements together in spaced relation, said end plates having projections extending through respective ones of said cut out portions, said cut out portions and projections being rectangular in the plane of the rule and having substantial dimension longitudinally of the rule, and lever means pivotally secured on the extended ends of said projections, said levers having means cooperating with respective projections operable on swinging said levers for clamping said components together.

13. A slide rule comprising, in combination, a pair of stator elements, means securing said stator elements together in spaced relation, a slider, said slider being made up of a plurality of components, each component having opposite flat sides forming scale faces, said components being congruent in outline and having their flat sides fitted together, each component being reversible for presenting either of its scale faces outwardly.

14. A slide rule comprising, in combination, a pair of stator elements, each stator element being made up of a plurality of components, each stator element having a cut out portion at each end thereof, means cooperating with said cut out portions for securing said stator elements together in spaced relation, a slider, said slider being made up of a plurality of components, said slider having a cut out portion in each end thereof congruent in outline with the cut out portions in said stator elements, and means cooperating with the cut out portions in said slider for securing the components thereof together.

15. An element for a slide rule comprising a plurality of components, each component having opposite flat sides forming scale faces, said components being congruent in outline and having their flat sides fitted together, each component being reversible for presenting either of its scale faces outwardly.

16. A slide rule comprising, in combination, a pair of stator elements and a slider element, each of said elements being made up of a single component and having scale faces on both sides thereof, all of said elements being mutually interchangeable and each being reversible for presenting either scale face thereof to either side of the rule, and means detachably securing said stator elements together in spaced relation.

17. A slide rule comprising, in combination, a pair of stator elements, and a slider element, all of said elements being mutually interchangeable, each of said elements having cut-out portions in each end thereof, and means for detachably securing said stator elements together in spaced relation, said means comprising a pair of retaining plates at each end of the rule, the plates of each pair being disposed on opposite sides of the rule, each plate having cut-out portions in register with the cut-out portions of said stator elements, a locking plate individual to each retaining plate, each locking plate having a transverse extension extending through the rule in respective cut-out portions, each locking plate having a lever portion individual to the extended end of respective transverse extensions, said lever portions and extensions having intercooperating means operable on swinging said levers for clamping said locking plates and retaining plates into locking engagement with said stator elements.

18. A slide rule comprising, in combination, a pair of stator elements, and a slider, and end pieces securing the stator elements together in spaced relation, said end pieces being secured to said stator elements by friction and being removable therefrom.

19. A slide rule comprising, in combination, a pair of stator elements, and a slider, end pieces securing the stator elements together in spaced relation, said end pieces having portions engaging opposite sides of the respective stator elements, and means for biasing said portions into tight engagement with said stator elements, said end pieces being thereby secured to said stator elements by friction and being removable therefrom.

20. A slide rule comprising, in combination, a pair of stator elements, and a slider, each of said stator elements being made up of a plurality of components, and end pieces, thereby securing the components of the respective stator elements together and being thereby secured to said stator elements by friction, said end pieces being removable from said stator elements.

21. A slide rule comprising, in combination, a pair of stator elements, and a slider, and end pieces longitudinally slidable onto and off of the stator elements at the ends of the rule, said end pieces having friction engagement with said stator elements and thereby securing said stator elements together in spaced relation.

22. A slide rule comprising, in combination, a pair of stator elements, and a slider, end pieces longitudinally slidable onto and off of the stator elements at the ends of the rule, said end pieces having portions movable into and out of tight friction engagement with the respective stator elements, and means for moving said portions into said tight friction engagement, said end pieces thereby securing said stator elements together in spaced relation.

ARTHUR F. ECKEL.

REFERENCES CITED

The following references are of record in the file of this patent:

UNITED STATES PATENTS

| Number | Name | Date |
| --- | --- | --- |
| 1,942,349 | Wompner | Jan. 2, 1934 |